United States Patent [19]

Nozawa et al.

[11] Patent Number: 4,947,191

[45] Date of Patent: Aug. 7, 1990

[54] INK JET RECORDING APPARATUS

[75] Inventors: Minoru Nozawa, Hiratsuka; Yutaka Koizumi, Tokyo; Toshihiro Mori, Hiratsuka; Atsushi Saito, Yokohama, all of Japan

[73] Assignee: Canon Kabushiki Kaisha, Tokyo, Japan

[21] Appl. No.: 411,202

[22] Filed: Sep. 21, 1989

Related U.S. Application Data

[63] Continuation of Ser. No. 276,302, Nov. 25, 1988, abandoned.

[30] Foreign Application Priority Data

Nov. 27, 1987 [JP] Japan ................................ 62-297792
Nov. 27, 1987 [JP] Japan ................................ 62-297793

[51] Int. Cl.[5] ............................................ G01D 15/18
[52] U.S. Cl. ................................................ 346/140 R
[58] Field of Search ............ 346/75, 140 P D, 140 I J

[56] References Cited

U.S. PATENT DOCUMENTS 4,123,761 10/1978 Kimura et al. .................. 346/140 R
4,144,537 3/1979 Kimura et al. .................. 346/140 R
4,223,324 9/1980 Yamamori et al. ............. 346/140 R
4,518,973 5/1985 Tazaki ............................. 346/140 R
4,631,554 12/1986 Terasawa .................... 346/140 P D
4,728,970 3/1988 Terasawa ..................... 346/140 P D
4,739,340 4/1988 Terasawa ............... 346/140 P D X

FOREIGN PATENT DOCUMENTS 57-12660 1/1982 Japan .

*Primary Examiner*—George H. Miller, Jr.
*Attorney, Agent, or Firm*—Fitzpatrick, Cella, Harper & Scinto

[57] ABSTRACT

The present invention relates to an ink jet recording apparatus comprising an ink jet head having plural opening for discharging an ink, partial capping means for covering a part of said plural discharging opening, and suction means for sucking the ink from said part of discharging opening through said partial capping means.

65 Claims, 13 Drawing Sheets

INK JET RECORDING APPARATUS

This application is a continuation of application Ser. No. 07/276,302 filed Nov. 25, 1988, now abandoned.

BACKGROUND OF THE INVENTION

1. Field of the Invention

The present invention relates to an ink jet recording apparatus for image recording by discharging of recording liquid (ink), and more particularly to an ink jet recording apparatus equipped with a recording head having plural orifices with an improved recovery system for orifice clogging caused by dust, or defective discharging from the orifice caused by viscosity increase of ink or presence of bubbles therein.

2. Related Background Art

FIG. 1 is a schematic perspective view showing an example of the recording head employed in the ink jet recording apparatus, wherein a discharging element 1 is provided with liquid paths in which respectively arranged are heat generating elements constituting means for generating thermal energy utilized for the ink discharging, discharging openings 10 provided at the front ends of said liquid paths and a common liquid chamber for storing ink to be supplied to said liquid paths, and discharges ink from said discharging openings to form recording liquid droplets.

There are further shown a base plate 3 for fixing the discharging element 1 for example with an adhesive; a front plate 2 fixed on an end face of the discharging element 1 and the base plate 3 for example with bolts and having an aperture *2a* for maintaining the discharging openings 10 in direct facing relationship to a recording medium; and members 15, 16. 17 constituting a part of an ink supply system, in which 15 is a connecting elbow pipe for introducing ink to the common liquid chamber in the discharging element 1, 17 is a filter unit provided in the ink supply path from an ink source such as an ink tank, and 16 is a supply pipe connecting the member 15 with the filter unit 17.

FIGS. 2 and 3 are respectively vertical and horizontal schematic cross-sectional view of the recording head shown in FIG. 1, wherein a cap 4 is pressed to the face of discharging openings of the discharging element 1 across the front plate 2 (omitted in FIGS. 2 and 3) for the recovery of discharging failure.

The liquid paths 12 respectively corresponding to plural discharging openings 10 communicate with a so-called canopy portion 13, which in turn communicates with a common liquid chamber 14. Energy generating means 11, for example composed of a heat generating element is provided in the liquid path 12 for the purpose of generating energy utilized for ink discharging. Inside the filter unit 17 there is provided a filter 100 composed of a mesh for eliminating small dust particles and bubbles.

FIG. 4 is a schematic view of a discharge failure recovery system in the conventional ink jet recording apparatus. In the normal recording state, a cap 4 is placed in a position not hindering the recording operation, and the ink is supplied from the ink tank 6 to the discharge element 1 by capillary action.

At the recovery of discharge failure, the cap 4 is fitted on the discharge element 1 in air-tight manner, and a pump 7 is actuated in this state to generate a negative pressure inside the cap 4 in comparison with the ink tank 6, thereby forcibly sucking the ink from the discharging opening 10. At the same time, the dust, viscous ink, bubbles etc. responsible for the discharge failure are removed from the discharge element 1, together with the sucked ink. For example a minute bubble a that has migrated into a liquid path 12 as shown in FIG. 3 can be removed through the discharging opening 10 together with the ink, by the actuation of the pump 7. The ink removed from the discharging opening 10 is received by the cap 4 and guided to a used ink tank 5.

FIG. 5 is a circuit diagram showing a fluid chemical equivalent circuit for the ink in the discharge failure recovery in the conventional apparatus. At the discharge failure recovery, the following relation exists.

$$\Delta P = qR1 + nq(RH + RC + RF + RS) \quad (1)$$

among the suction force ΔP, number of liquid paths n, fluid resistance R1 per each liquid path, fluid resistance RH of the canopy 13, fluid resistance RC of the common liquid chamber 14, fluid resistance RF of the filter 17, fluid resistance RS from the ink tank 6 to the common liquid chamber 14 except the filter 17, and flow rate q of the liquid path 12 with a suction force ΔP. Thus:

$$q = \Delta P / \{R1 + n(RH + RC + RF + RS)\} \quad (2)$$

Usually the supply system is so designed as to obtain a relation $R1 > RH + RC + RF + RS$, but, in a so-called full-line multiple head in which the discharging openings respectively communicating with the liquid paths are arranged by a number corresponding to the full recording width, the number n of the liquid paths becomes very large, so that the flow rate q per liquid path becomes very small. Also in case bubbles or dust particles enter the liquid path 12 as shown in FIG. 3, the fluid resistance of said liquid path becomes higher. Consequently the flow rate in the liquid path with discharge failure becomes even lower than in the normal liquid path.

Let us consider a case in which a bubble has entered a liquid path 12. Since the bubble usually sticks to the wall of the liquid path, there is required a pressure change or a flow rate in the liquid path 12, in order to peel the bubble off the wall. However, in such conventional structure, since the fluid resistance is smaller in the normal liquid paths, the pressure change obtained in the liquid path with discharge failure becomes even smaller.

FIG. 6 is a schematic perspective view showing another example of the recording head employed in the conventional ink jet recording apparatus, and FIGS. 7 and 8 are respectively a vertical and horizontal schematic cross-sectional views of the recording head shown in FIG. 6.

The present example differs from the foregoing example in that the discharging element 1 is provided with two supply pipes 16, and that the recovery of discharge failure is conducted with a pressure applied to the ink in the supply pipes 16.

In the present example, receiving member **4*a*** is provided for receiving the ink expelled from the discharging openings by the pressure.

FIG. 9 is a schematic view of a discharge failure recovery system in the ink jet recording apparatus of the present example. In the normal recording state, a receiving member (cap) **4*a*** is placed at a suitable position not hindering the recording operation, and a valve B2 is closed while valves B1, B3 are opened, whereby the ink is supplied from an ink tank 6 to a discharging element 1 through the valve B1 by capillary action.

At the discharge failure recovery, the cap 4a is fitted on the discharging element 1, and the valve B1 is closed while the valves B2, B3 are opened. In this state a pump 7 is actuated to send the ink from the ink tank 6 to the ink supply path under pressure, thereby supplying the discharging element 1 with pressurized ink and forcedly ejecting ink from the discharging openings 10. At the same time, the dust, viscous ink, bubbles etc. responsible for the discharge failure are removed from the discharging element 1, together with the ejected ink. For example a minute bubble a that has migrated into a liquid path 12 as shown in FIG. 8 can be removed through the discharging opening 10 together with the ink, by the actuation of the pump 7. The ink removed from the discharging opening 10 is received by the cap 4a and guided to a used ink tank 5.

Now reference is made to FIG. 5 for explaining the fluid mechanical equivalent circuit in the present prior art. At the discharge failure recovery, the following relation exists $$\Delta P = qR1 + nq(RH+RC+RF+RS) \quad (1)$$

among the pressure ΔP, number n of liquid path, fluid resistance R1 per each liquid path 12, fluid resistance RH of the canopy 13, fluid resistance RC of the common liquid chamber, fluid resistance RF of the filter 17, fluid resistance RS from the ink tank 6 to the common liquid chamber 14 except the filter 17, and flow rate q of the liquid path 12 under the pressure ΔP. Thus:

$$q = \Delta P / \{R1 + n(RH+RC+RF+RS)\} \quad (2)$$

Usually the supply system is so designed as to obtain a relation $R1 > RH+RC+RF+RS$, but, in a so-called full-line multiple head in which the discharging openings respectively communicating with the liquid paths are arranged by a number corresponding to the full recording width, the number n of the liquid paths becomes very large, so that the flow rate q per liquid path becomes very small. Also in case bubbles or dust particles enter the liquid path 12 as shown in FIG. 8, the fluid resistance of said liquid path becomes higher. Consequently the flow rate in the liquid path with discharge failure becomes even lower than in the normal liquid path.

Consequently the conventional recovery system for discharge failure has been often unable to restore the defective liquid path to the normal state, or has to repeat the recovery operation to realize such normal state.

Also there has been required a large suction force or pressure in order to overcome such fluid resistance, and a large pump 7 has been required for this purpose. This has resulted in a larger consumption of ink, and, particularly in case of a recovery operation with an increased pressure, a need for an increased junction strength for withstanding such pressure.

SUMMARY OF THE INVENTION

An object of the present invention is to provide an ink jet recording apparatus capable of highly reliable recovery operation without an increase in the cost of manufacture or operation resulting from the use of a bulkier system or a design for the higher pressure.

Another object of the present invention is to provide an ink jet recording apparatus having an ink jet head provided with plural discharging openings for emitting ink; partial capping means for covering a part of said plural discharging openings; and suction means for sucking ink from said part of the discharge openings through said partial capping means.

It is still another object of the present invention to provide a capping unit comprising partial capping means for covering a part of plural discharging openings of an ink jet head; and suction means for sucking ink from said part of the discharging openings through said partial capping means.

It is still another object of the present invention to provide an ink jet head having plural openings for discharging ink, closing means for closing a part of said plural discharging openings, and pressurizing means for pressurizing the ink in said ink jet head, thereby ejecting ink from the discharging openings other than those of said part.

It is still another object of the present invention to provide a recovery method for an ink jet head comprising, a detection step for detecting the ink discharging step from plural discharging openings of said ink jet bead; a partial capping step for covering a part of said plural discharging openings, including the discharging opening for which the discharge failure is detected, with partial capping means; and a partial suction step for sucking ink from said part of the discharging openings through said partial capping means.

It is still another object of the present invention to provide a recovery method for an ink jet head comprising, a detection step for detecting the ink discharge state from plural discharging openings of said ink jet head; a partial closing step for closing a part of said plural discharging openings, excluding the discharging opening for which the discharge failure is detected, with closing means; and a partial pressurizing step for pressurizing the interior of said ink jet head thereby discharging ink from the discharging openings not closed by said closing means.

DETAILED DESCRIPTION OF THE PREFERRED EMBODIMENTS

The present invention is to achieve secure recovery of discharge failure by concentrating the force for recovery (suction force or pressure) on a part of plural discharging openings.

In a preferred embodiment of the present invention, when a cap is fitted on the recording head and suction means is actuated for recovery of the discharge failure, the ink is sucked only from the discharging openings covered by the cap and including the opening showing discharge failure, whereby the cause of discharge failure is eliminated.

In another preferred embodiment of the present invention, when a cap is fitted on the recording head and pressurizing means is actuated for recovery of the discharge failure, the ink is emitted only from the discharging openings covered by the cap and including the opening showing discharge failure, whereby the cause of discharge failure is eliminated.

In the following there will be given detailed explanation of the embodiments of the present invention.

In the following drawings showing the embodiments, the same parts as those in the foregoing prior art will be represented by same numbers and will not be explained further.

[First embodiment]

Figure 1:
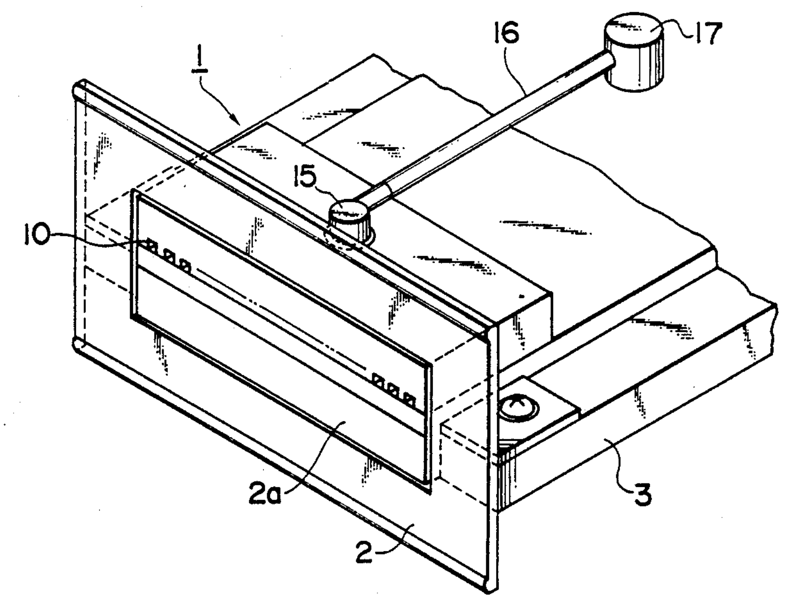
FIG. 1 PRIOR ART
FIG. 1 is a schematic perspective view showing an example of the recording head.
Figure 2:
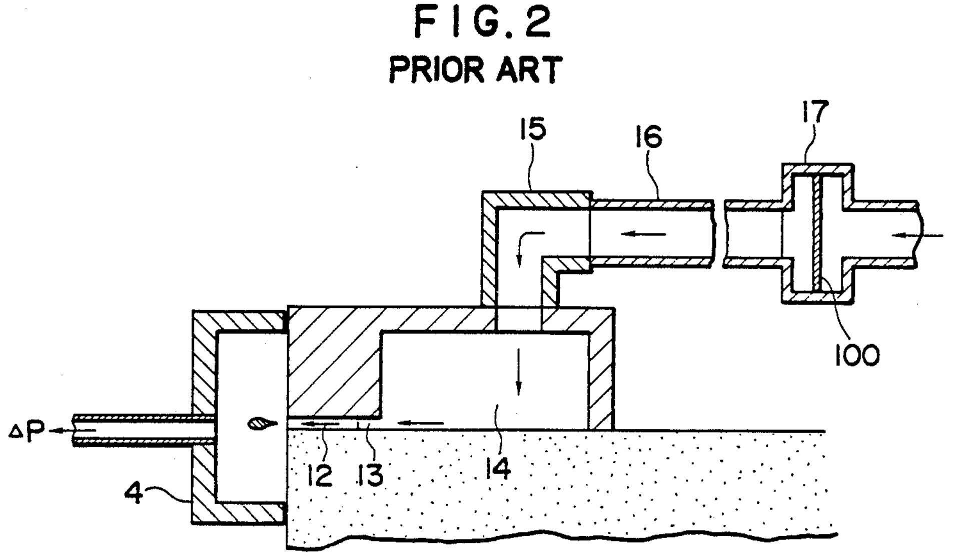
FIG. 2 PRIOR ART
FIGS. 2 and 3 are schematic cross-sectional views of a conventional recovery system for discharge failure.
Figure 3:
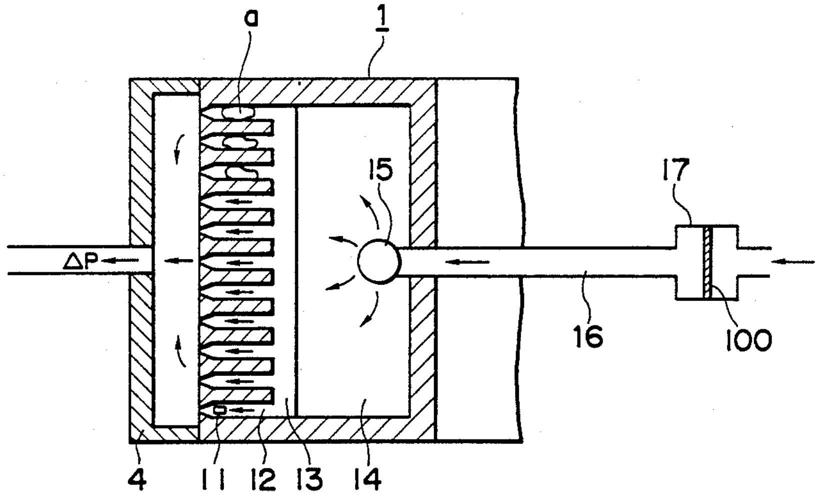
FIG. 3 PRIOR ART
Figure 10:
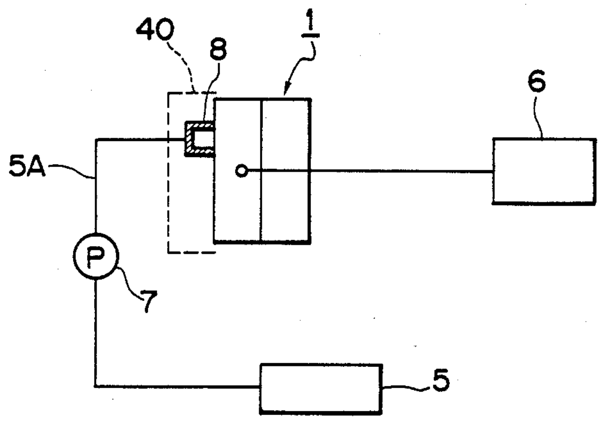
FIG. 10 is a schematic view of an embodiment of the principal portion of an ink jet recording apparatus of the present invention.

FIG. 10 is a schematic view showing a recovery system in the principal part of an ink jet recording apparatus of the present invention, wherein a partial cap 8 for covering a part of the array of discharging openings 10 (FIG. 1) is brought at the recovery of discharge failure, to a position opposed to the discharging element 1 by suitable drive means, but, in the normal recording operation, is placed in a non-opposed position which does not hinder the recording operation (for example a position distant from the discharge element in a direction perpendicular to the plane of drawing).

If the discharge failure occurs in the course of recording operation, the partial cap 8 is suitably moved and fitted on the discharge element so as to cover a portion including the discharging opening with said discharge failure, and the pump 7 is actuated in this state to effect the suction operation. In this operation the ink is ejected only from the discharging openings covered by the partial cap 8, and is recovered in the used ink tank 5 through a used ink tube 5A.

Figure 4:
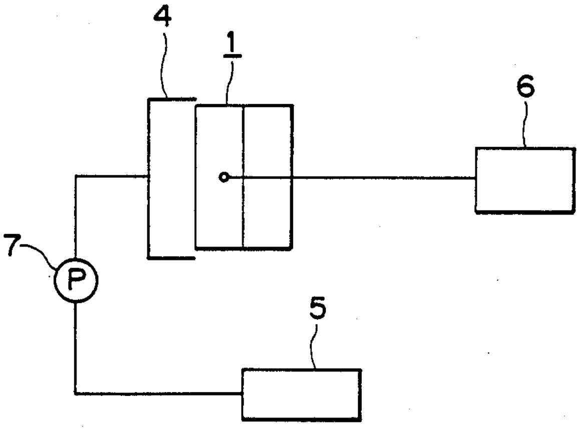
FIG. 4 PRIOR ART
FIG. 4 is a schematic view showing a conventional recovery system for discharge failure.

A broken-lined member 40 is an entire cap which is similar to the cap 4 shown in FIG. 4 and which can be fitted on the discharging element 1 instead of the cap 8. In the present embodiment, detector means for discharge failure is provided in said entire cap 40.

Figure 5:
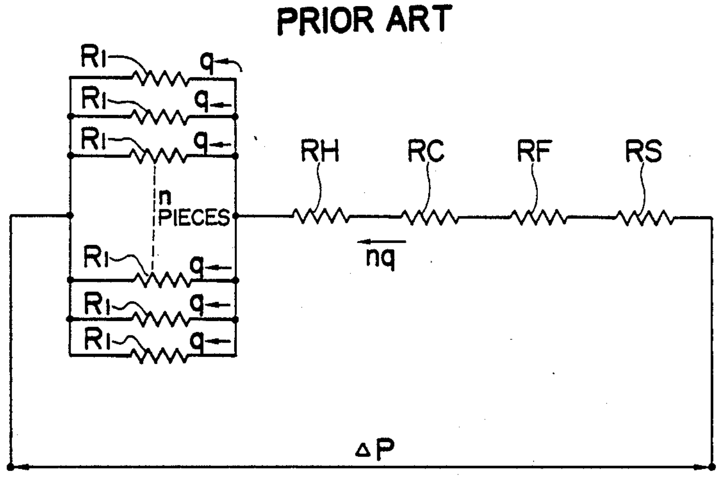
FIG. 5 PRIOR ART
FIG. 5 is an equivalent circuit diagram of a conventional recovery system for discharge failure.
Figure 11:
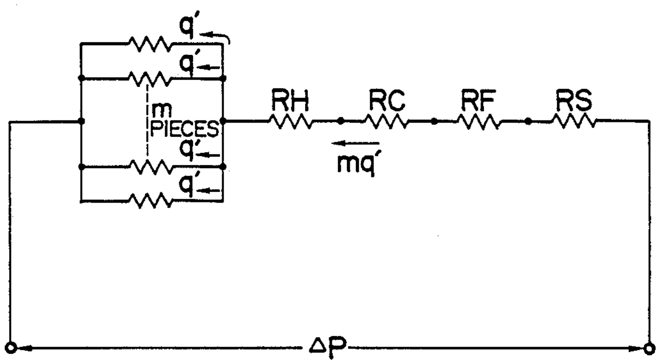
FIG. 11 is a fluid circuit diagram equivalent to the embodiment shown in FIG. 10.

FIG. 11 is a circuit diagram showing a fluid mechanical equivalent circuit of the discharge element at the recovery of discharge failure, wherein m indicates the number of liquid paths corresponding to the discharging openings 10 covered by the partial cap 8, q' is the flow rate per each of said liquid paths 12, and other symbols the same as already explained in relation to FIG. 5.

In this equivalent circuit there exists the following relation:

$$q' = \Delta P / \{R1 + m(RH + RC + RF + RS)\} \quad (3)$$

Since m<n, $$q' > q \quad (4)$$

Thus, if the suction force of the pump 7 is maintained constant, in comparison with the conventional apparatus in which the recovery operation is conducted by sucking the ink from all the discharging openings 10, the efficiency of recovery becomes higher as m becomes smaller than n. On the other hand, if the flow rate is maintained the same as in the conventional apparatus (q'=q). there can be employed a pump 7 with a smaller suction force.

In the recovery of discharge failure, the effect of recovery is larger as the number m of the discharging openings covered by the partial cap 8 decreases, but, if the discharge failure occurs in many liquid paths 12, there will be required a larger number of recovery operations, with accordingly increased time of recovery, as the number m decreases. In order to resolve this problem, the value of m can be selected in the following manner. The following relation exists for a flow rate $q_0$ capable of removing the cause of discharge failure such as bubbles in the liquid path 12:

$$m = (\Delta P - q_0 R1) / q_0(RH + RC + RF + RS) \quad (5)$$

and an optimum value of m can be selected accordingly. The value of $q_0$ can be easily determined for example experimentally.

In the following there will be explained the structure of the ink jet recording apparatus of the present embodiment.

Figure 12:
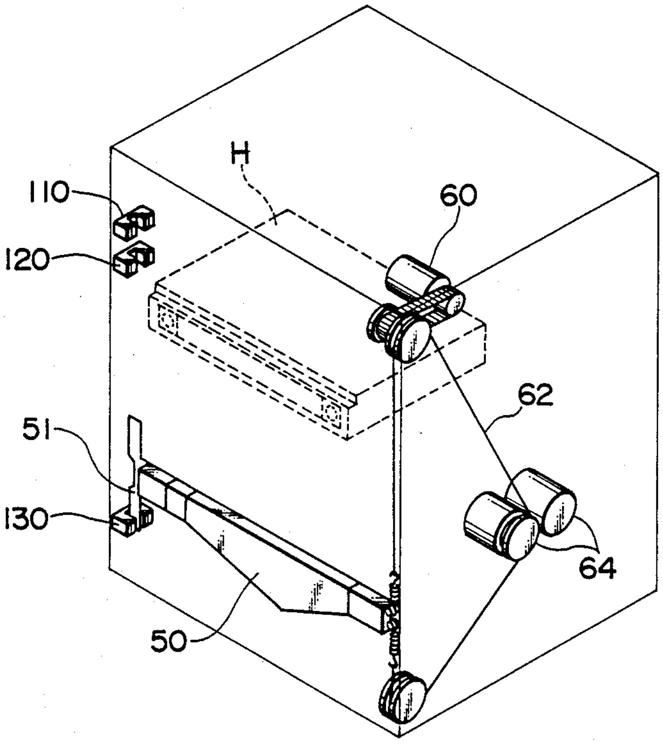
FIG. 12 is a schematic perspective view of an example of the structure of the ink jet recording apparatus of the present invention.

FIG. 12 is a schematic perspective view of an embodiment of the ink jet recording apparatus of the present invention, wherein shown are a recording head H comprising a discharging element 1 in which discharging openings 10 are arranged in the transversal direction of the recording medium over the entire width thereof; a capping unit 50 having a partial cap 8 and an entire cap 40, fixed on a wire 62 connected to a motor unit 60 and being vertically movable along unrepresented guides by the actuation of the motor unit 60; and a member 64 for regulating the tension of the wire 62.

Sensors 110, 120, for example composed of photocouplers, for detecting the elevated position of the capping unit 50, detects when the partial cap 8 or the entire cap 10 is opposed to the recording head 10. A sensor 130, composed of a photocoupler for detecting the lowered position of the capping unit 50, is used for setting the capping unit 50 at a position not opposed to the recording head H in the recording operation. A light shield plate 51 is provided on the capping unit 50 for intercepting the light path of the sensors 110, 120 and 130.

Figure 13:
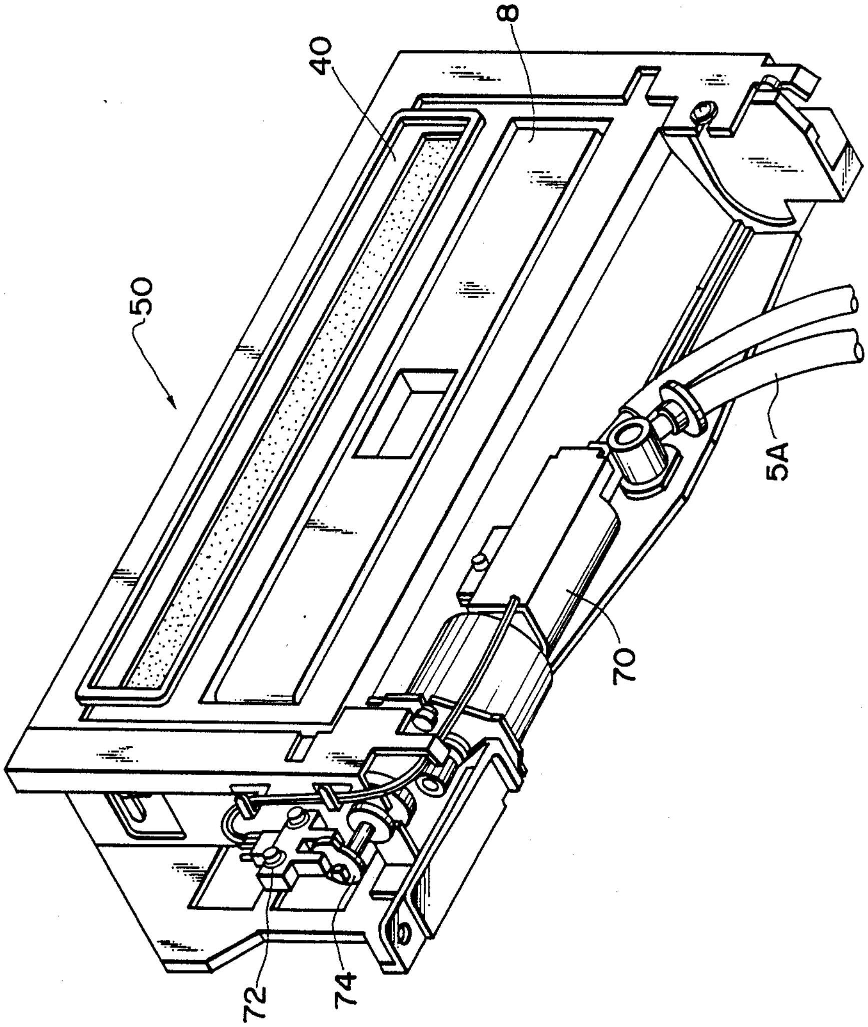
FIG. 13 is a schematic perspective view showing an example of a capping unit of the present invention.

FIG. 13 is a schematic perspective view of an example of the capping unit 50, wherein shown are a motor unit 70 for fitting or detaching the partial cap 8 or entire cap 40 of the capping unit 50 with or from the recording head H; a sensor 72 composed of a photocoupler provided on the capping unit 50, for detecting the fitted or detached position of the partial cap 8 and the entire cap 40 with respect to the recording head H; and a light shield plate 74 moving integrally with the partial cap 8 and the entire cap 40 for intercepting the light path of said sensor thereby detecting the fitted or detached state of said caps.

In the following the structure for effecting the recovery operation by means of the partial cap 8 and the entire cap 40 will be explained.

Figure 14:
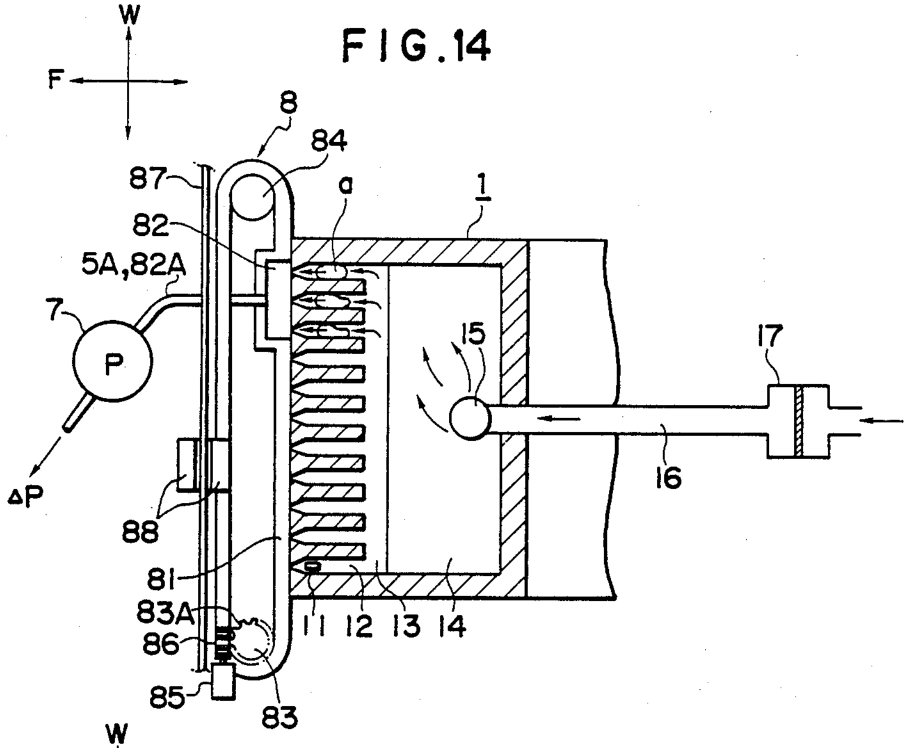
FIGS. 14 and 15 are schematic cross-sectional views respectively showing a state in which one or the other cap of the capping unit is fitted with the recording head.

FIG. 14 is a schematic cross-sectional view showing a state in which the partial cap 8 is positioned opposite to and fitted with the discharging element 1. The cap 8 of the present embodiment is provided with a cap member 81 of belt shape having a cap part 82 for covering a number the discharging openings determined according to the aforementioned equation (5). The remaining openings may or may not be sealed by said cap member 81. Also shown are a tube 82A integral with the used ink tube 5A; and pulleys 83, 84 for supporting the cap member 81 movably in a direction W which is parallel to the direction of arrangement of the discharging openings 10. A pulley 83 is provided with a gear 83A.

The rotation of a motor 85 is transmitted through a worm gear 86 provided on the shaft of said motor and the gear 83A to the pulley 83, thereby moving the cap member 81 in the direction W. There are further provided a slit plate 87 fixed to the partial cap 8, and a photocoupler 88 fixed on the cap member 81 for detecting the slit on the slit plate 87. The position of the cap member 81 can be identified from the detection signal.

The partial cap 8 including the above-mentioned parts is provided in the capping unit 50, and is rendered integrally movable in a direction F for fitting or detaching with or from the discharging element 1 by means of the motor unit 70.

Figure 15:
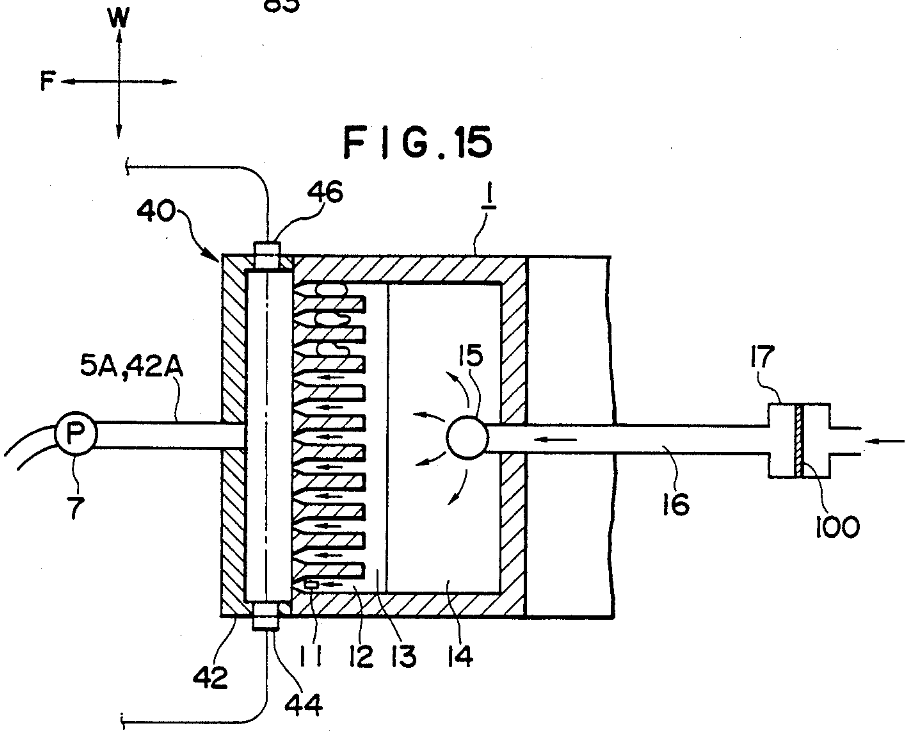

FIG. 15 is a schematic cross-sectional view showing a state in which the entire cap 40 is fitted with the discharging element 1, wherein shown are a cap 42 capable of covering all the discharging openings discharging element 1, and a light-emitting element 44 such as a semiconductor laser and a light receiving element 46 such as a phototransistor which are fixed on suitable positions on the lateral face of the cap 42 whereby the light path L therebetween can be intercepted by the droplets emitted by each of the discharging openIngs 10. 42A is a used ink tube integral with the used ink tube 5A.

Figure 16:
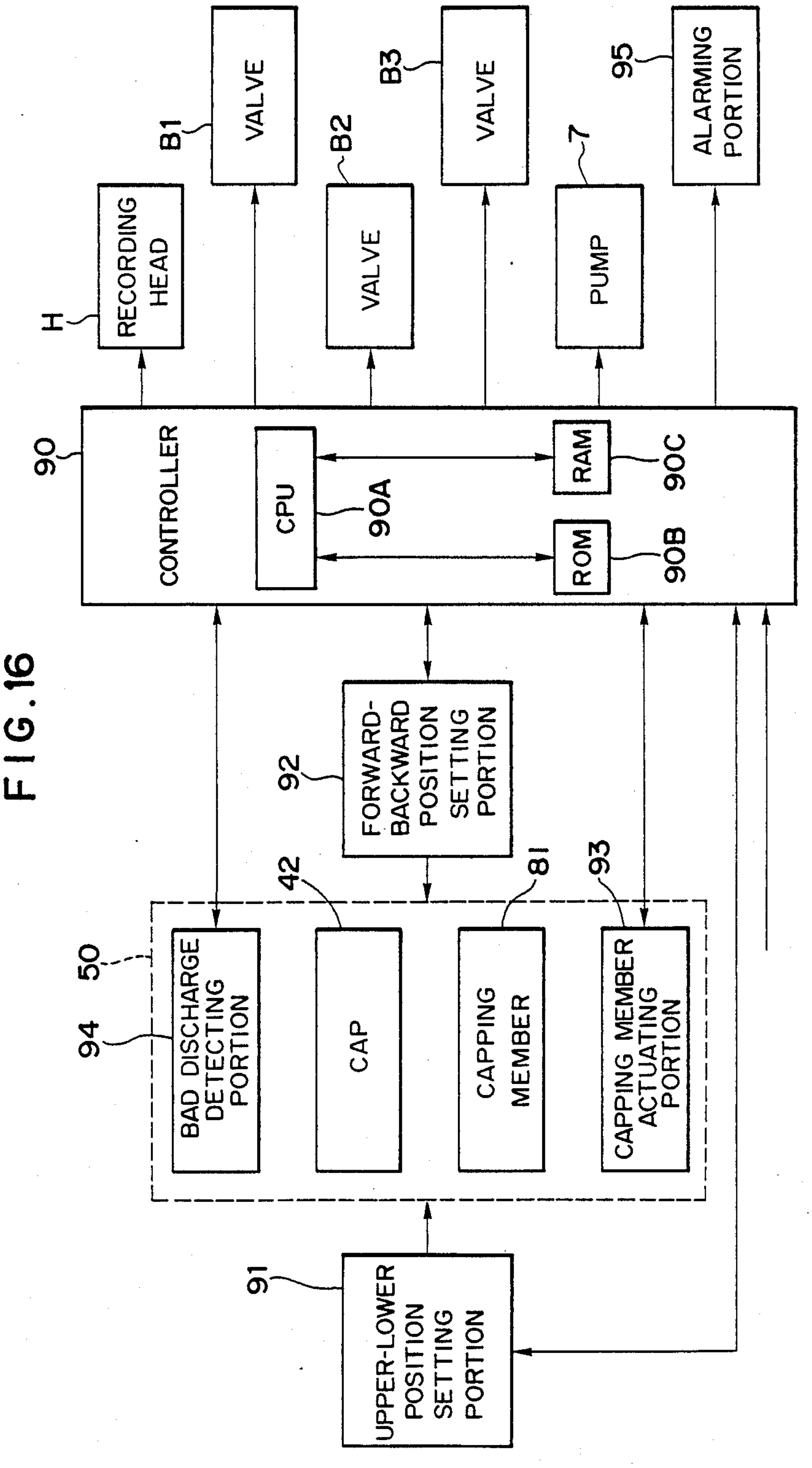
FIG. 16 is a block diagram of an example of the control system of the present invention.

FIG. 16 is a block diagram showing an example of the control system employed in the present embodiment, wherein a controller 90 for controlling various aspects of the discharge failure recover operation is also used as the controller for the recording operation in the ink jet recording apparatus. The controller 90 is provided with a CPU 90A for executing the control sequence shown in FIG. 12; a ROM 90B storing a program corresponding to the control sequence to be executed by the CPU 90A and other fixed data; and a RAM 9OB serving as a work memory.

A position setting unit 91 for setting the vertical position of the capping unit 50 includes, as shown in FIG. 12, the motor unit 60, sensors 110, 120, 130 etc. A position setting unit 92 for driving the capping unit 50 in the direction F shown in FIGS. 14 and 15 in order to set said unit in a position fitted with or detached from the discharging element 1 includes, as shown in FIG. 13, the motor 70, the sensor 72 etc.

A cap member driving unit 93, for driving the cap member 81 of the cap 8 in the direction W in FIG. 14 to drive the cap part 82 in a position opposed to the discharging opening with discharge failure, includes the motor 85, photocoupler 88 etc. shown in FIG. 14. A detector unit 94 for detecting the discharge failure includes the light-emitting element 44 and the light-receiving element 46 shown in FIG. 15.

An alarm unit 95, composed of a display unit or a buzzer, is provided for giving alarm in case the discharge failure is not eliminated after a predetermined number of recovery operations.

Figure 17:
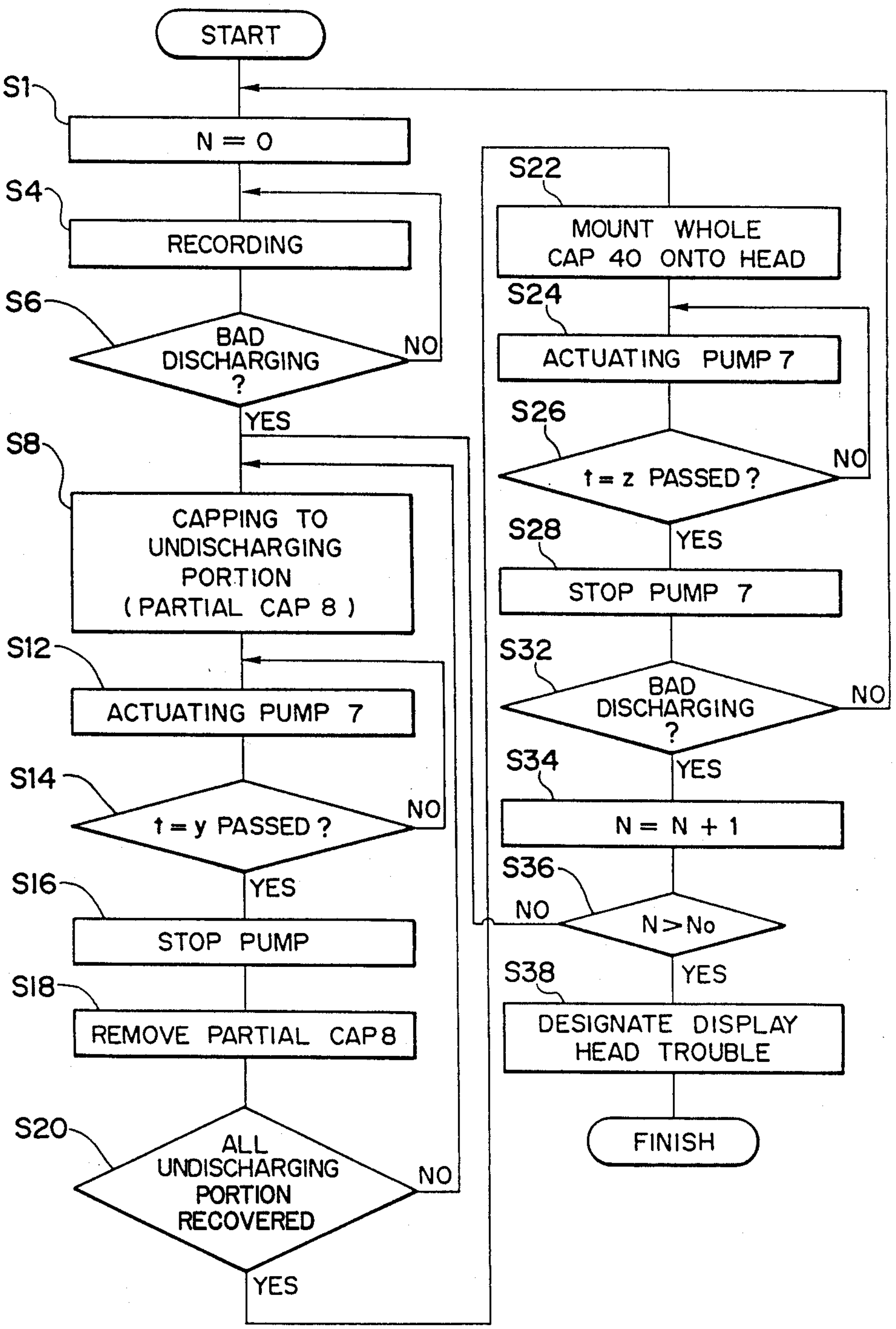
FIG. 17 is a flow chart showing an example of control sequence for recording and discharge failure recovery in the control system shown in FIG. 16.

FIG. 17 is a flow chart showing an example of the control sequence for the recording and the discharge failure recovery in the present embodiment. At the start of sequence, at first a step S1 resets a counter N for counting the number of recovery operations, then a step S4 executes the recording for a predetermined amount or time, and a step S6 detects the discharge failure.

In said detection, the cap 42 of the entire cap 40 is fitted on the discharging element 1 of the recording head H as shown in FIG. 15 by means of the position setting units 91, 92 as shown in FIG. 16, and the light-emitting element 44 is actuated to emit light toward the light-receiving element 46. Then driving pulses of a predetermined frequency are supplied to the energy generating means in the liquid paths 12, in succession starting from the one positioned at the end. Each discharging opening communicating with the normal liquid path emits droplets, thus intercepting the light path L and causing a switching operation in the light receiving element 46. On the other hand, each opening communicating with the liquid path involving discharge failure either cannot achieve normal discharging or does not discharge a droplet at all, so that the light-receiving element 46 shows unstable switching or is not switched. In this manner the discharge failure is detected, and the position of the liquid path of the energy generating means then actuated is stored in the RAM 9OC for use in the succeeding recovery operation for the discharge failure. Said detecting operation can be completed in about 1.6 seconds if the discharges are conducted with a driving frequency of 2 KHz for the discharging openings arranged over the width of an A4-sized recording sheet.

The sequence returns to the step S4 if the discharge failure is not detected. On the other hand, if the discharge failure is detected, a step S8 suitably drives the position setting units 91, 92 and the driving unit 93 to place the cap part 8S in a position close to the discharging opening 10 showing discharge failure, and to fit the partial cap 8 so as to cover said opening 10, and a step S12 actuates the pump 7.

Thus a negative pressure is generated inside the cap part 82, whereby the ink is sucked only from the discharging openings covered by the cap part 82, thus removing the cause of the discharge failure. For example, in FIG. 14, the ink is sucked from the discharging openings 10 covered by the cap 82, whereby the bubble a present in the liquid path 12 is removed.

After the continuation of this state for a predetermined period, identified for example by the arrival of the timer value t at a predetermined value y (step S14). a step S16 deactuates the pump 7, and a step S18 moves the partial cap 8 in the direction F shown in FIG. 14 thereby detaching it from the discharging element 1.

A step S2O discriminates whether the suction recovery process has been conducted on all the discharging openings 10 showing discharging failure, and, if completed, the sequence proceeds to a step S22. On the other hand, if not completed, the sequence returns to the step S8 for setting the cap 82 to another discharging opening 10 showing discharge failure and effecting the recovery operation for said discharging opening.

If the discrimination in the step S2O turns out affirmative, the step S22 suitably actuates the position setting units 91. 92 and the driving unit 93 to fit the entire cap 10, instead of the partial cap 8, on the discharging element 1. Then a step S24 actuates the pump 7 in this state. thereby causing discharging of the ink from all the discharging openings 10. A step S26 continues this operation for a predetermined period (for example until the timer value t reaches a predetermined value z), and a step S28 deactuates the pump 7. These steps S22 to S28 may be dispensed with in the present embodiment.

Then a step S32 executes detection of discharge failure as in the step S6. If the result is negative, the sequence returns to the step S1 for preparing for a next recording operation. On the other hand, if the result is affirmative, a step S34 advances the count of the counter N by one, and a step S36 discriminates whether the count of the counter N has exceeded a predetermined value $N_0$, for example "1".

If said discrimination turns out negative, the sequence returns to the step S8 for repeating the recovery operation for the discharge failure. On the other hand, if the step S36 provides an affirmative discrimination, indicating that the cause of discharge failure has not been removed even after a predetermined number of recovery operations, an abnormality is identified, and the alarm unit 95 is actuated to inform the operator of this fact, for example by a display.

As explained in the foregoing, the present embodiment removes the cause of discharge failure by sucking the ink only from a portion in which the discharge failure has occurred, so that it is rendered possible to select a smaller pump 7, or to increase the flow rate per liquid path, and to prevent the wasting of the ink. Besides the present embodiment allows prompt detection of an abnormality in the recording head.

[Second embodiment]

In the second embodiment, the structure of the principal part of the ink jet recording apparatus, basic structure of the capping unit and the control system of the ink recording apparatus are substantially the same as those already explained in relation to FIGS. 12, 13 and 16 in the first embodiment, and will not, therefore, be explained again.

Figure 6:
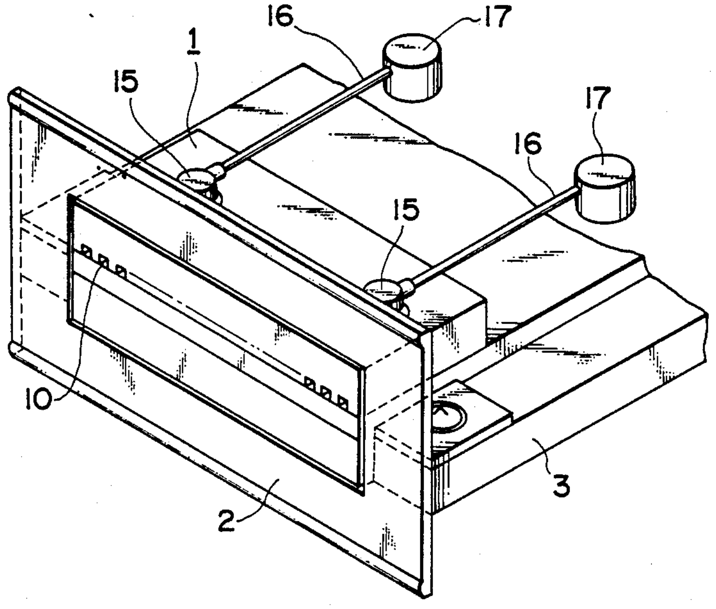
FIG. 6 PRIOR ART
FIG. 6 is a schematic perspective view of another example of the recording head.
Figure 7:
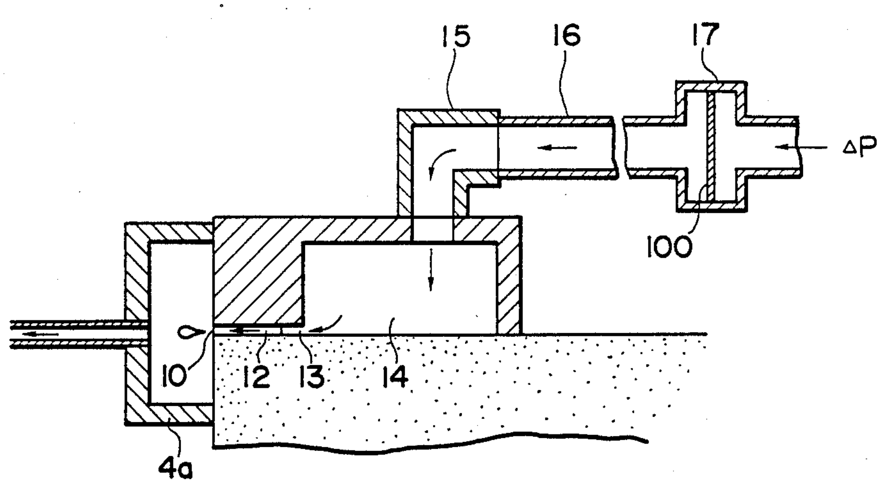
FIG. 7 PRIOR ART
FIGS. 7 and 8 are schematic cross-sectional views of another conventional recovery system for discharge failure.
Figure 8:
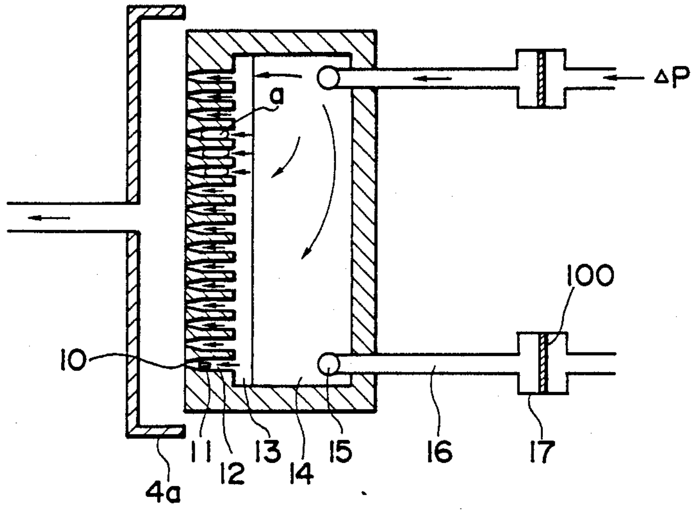
FIG. 8 PRIOR ART
Figure 18:
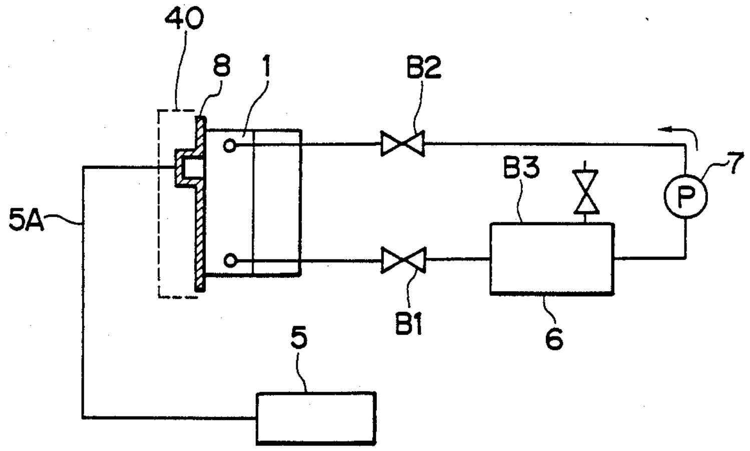
FIG. 18 is a schematic view of another embodiment of the principal part of the ink jet recording apparatus of the present invention.

FIG. 18 is a schematic view of another embodiment of the recovery system in the principal part of the ink jet recording apparatus of the present invention, wherein a partial cap 8, for maintaining a part of the array of the discharging openings 10 (see FIG. 6) in an open state and maintaining the remainder in a sealed state, is set in a position opposite to the discharging element in the recovery operation of discharge failure, but is set, in the normal recording operation, in a non-opposed position, not hindering the recording operation, which is a position distant from the discharging element, 1 for example in a direction perpendicular to the plane of drawing.

If a discharge failure occurs in the course of the recording operation, the partial cap 8 is so moved and fitted on the discharging element 1 that a portion including the discharging opening showing said discharge failure is maintained in the open state, and, in this state, the valve 81 is closed while the valves 82, 83 are opened and the pump 7 is actuated to send pressurized ink to the discharging element 1. The ink is discharged only from the openings 10 in the open state, and is recovered in the used ink tank 5 through the used ink tube 5A.

Figure 9:
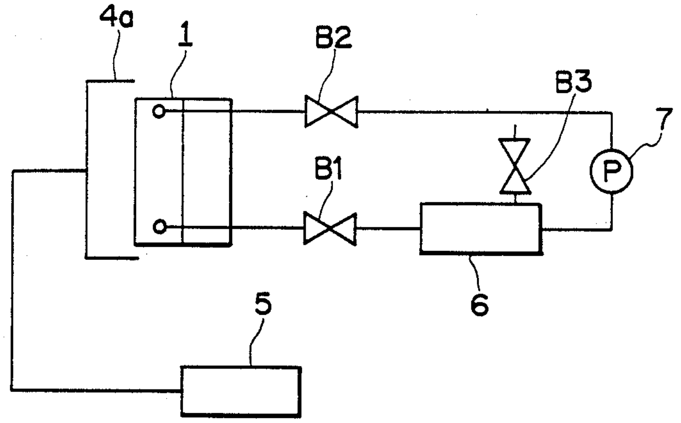
FIG. 9 PRIOR ART
FIG. 9 is a schematic view of another conventional recovery system for discharge failure.

A broken-lined member 40 is an entire cap similar to the cap 4a shown in FIG. 9, and can be fitted on the discharging element 1 in place for the partial cap 8. In the present embodiment, detector means for the discharge failure is provided in said entire cap 40.

Figure 19:
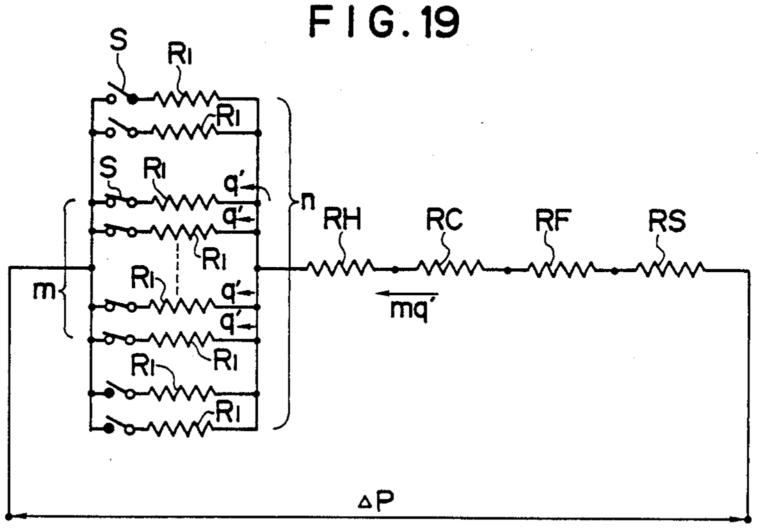
FIG. 19 is a fluid circuit diagram equivalent to the embodiment shown in FIG. 18.

FIG. 19 is a circuit diagram showing a fluid mechanical equivalent diagram of the discharging element at the recovery operation for the discharge failure, in which the open and closed states of the discharging opening are respectively represented by the closed and open state of switches S. The symbol m indicates the number of liquid paths 12 corresponding to the liquid paths 12 in the open state, while q' is the flow rate in each of said liquid paths 12, and other symbols are same as those in the foregoing description in relation to FIG. 5. The following relation exists in the present equivalent circuit:

$$q'=\Delta P/\{R1+m(RH+RC+RF+RS)\} \quad (3)$$

Since $m<n$;

$$q'>q \quad (4)$$

Thus, if the pressure of the pump 7 is maintained constant, in comparison with the conventional apparatus in which the recovery operation is conducted by discharging the ink from all the discharging openings 10, the efficiency of recovery becomes higher as m becomes smaller than n. Or, if the flow rate is maintained same as in the conventional apparatus ($q'=q$), there can be employed a pump 7 with a smaller pressure.

In the recovery of discharge failure, the effect of recovery is larger as the number m of the discharging openings maintained open by the partial cap 8 decreases, but, if the discharge failure occurs in many liquid paths 12, there will be required a larger number of recovery operations, with accordingly increased time of recovery, as the number m decreases. In order to resolve this problem, the value of m can be selected in the following manner. The following relation stands for a flow rate $q_0$ capable of removing the cause of discharge failure such as bubbles in the liquid path 12:

$$m=(\Delta P-q_0R1)/q_0(RH+RC+RF+RS) \quad (5)$$

and an optimum value of m can be selected accordingly. The value of $q_0$ can be easily determined for example experimentally.

In the following there will be explained a structure for effecting the recovery operation by driving the partial cap 8 and the entire cap 40.

Figure 20:
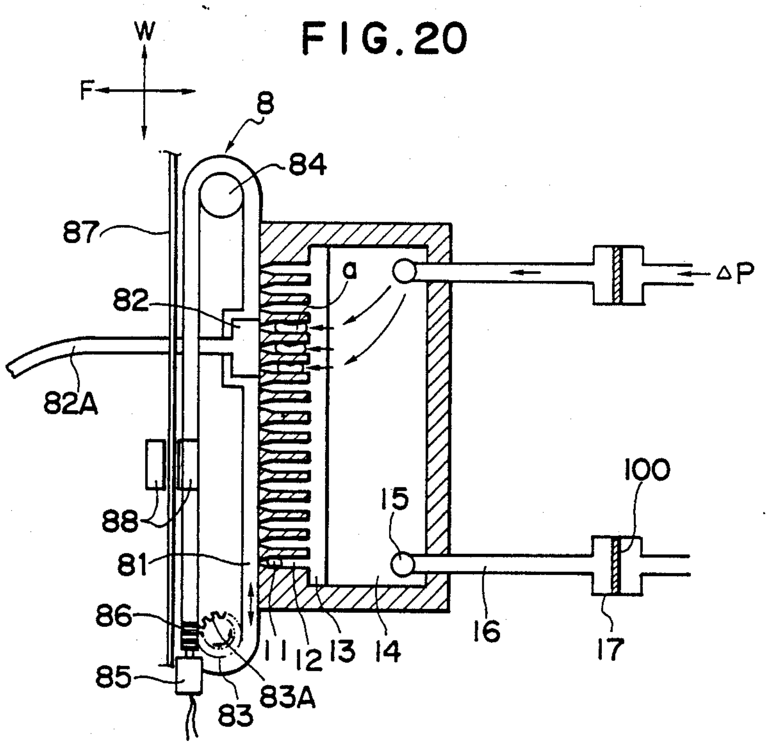
FIGS. 20 and 21 are schematic cross-sectional views respectively showing a state in which one or the other cap of the capping unit of another embodiment is fitted on the recording head.

FIG. 20 is a schematic cross-sectional view showing a state in which the partial cap 8 is fitted on the discharging element 1. The partial cap 8 is provided with a belt-shaped cap member 81, composed for example of rubber, capable of being fitted on and closing the discharging openings 10, further having a cap part 82 for maintaining the discharging openings of a number, determined according to the aforementioned relation (5), in an open state. There are also shown a tube 82A communicating with the used ink tube 5A; and pulleys 83, 84 for supporting the cap member 81 movably in a direction W parallel to the direction of arrangement of the discharging openings 10. A pulley 83 is provided with a gear 83A.

The rotation of a motor 85 is transmitted through a worm gear 86 provided on the shaft of said motor and the gear 83A to the pulley 83, thereby moving the cap member 81 in the direction W. There are further provided a slit plate 87 fixed to the partial cap 8, and a photocoupler 88 fixed on the cap member 81 for detecting the slit on the slit plate 87. The position of the cap member 81 can be identified from the detection signal.

The partial cap 8 including the above-mentioned parts is provided in the capping unit 50, and is rendered integrally movable in a direction F for fitting or detaching with or from the discharging element 1 by mean of the motor unit 70.

Figure 21:
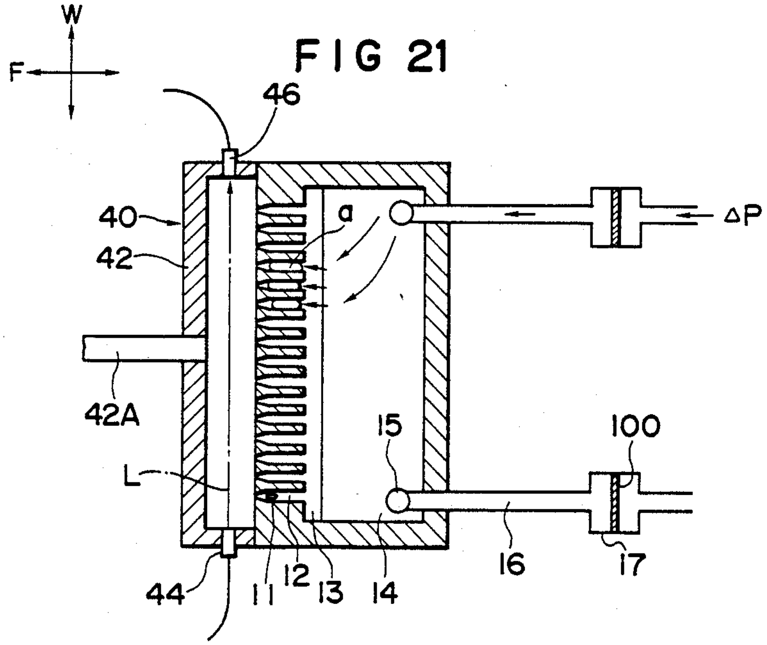

FIG. 21 is a schematic cross-sectional view showing a state in which the entire cap 40 is fitted with the discharging element 1, wherein shown are a cap 42 capable of covering all the discharging openings of the discharging element 1 in the open state, and a light-emitting element 44 such as a semiconductor laser and a light receiving element 46 such as a phototransistor which are fixed on suitable positions on the lateral face of the cap 42 whereby the light path L therebetween can be intercepted by the droplets discharged by each of the discharging openings 10. 42A indicates a used ink tube communicating with the used ink tube 5A.

Figure 22:
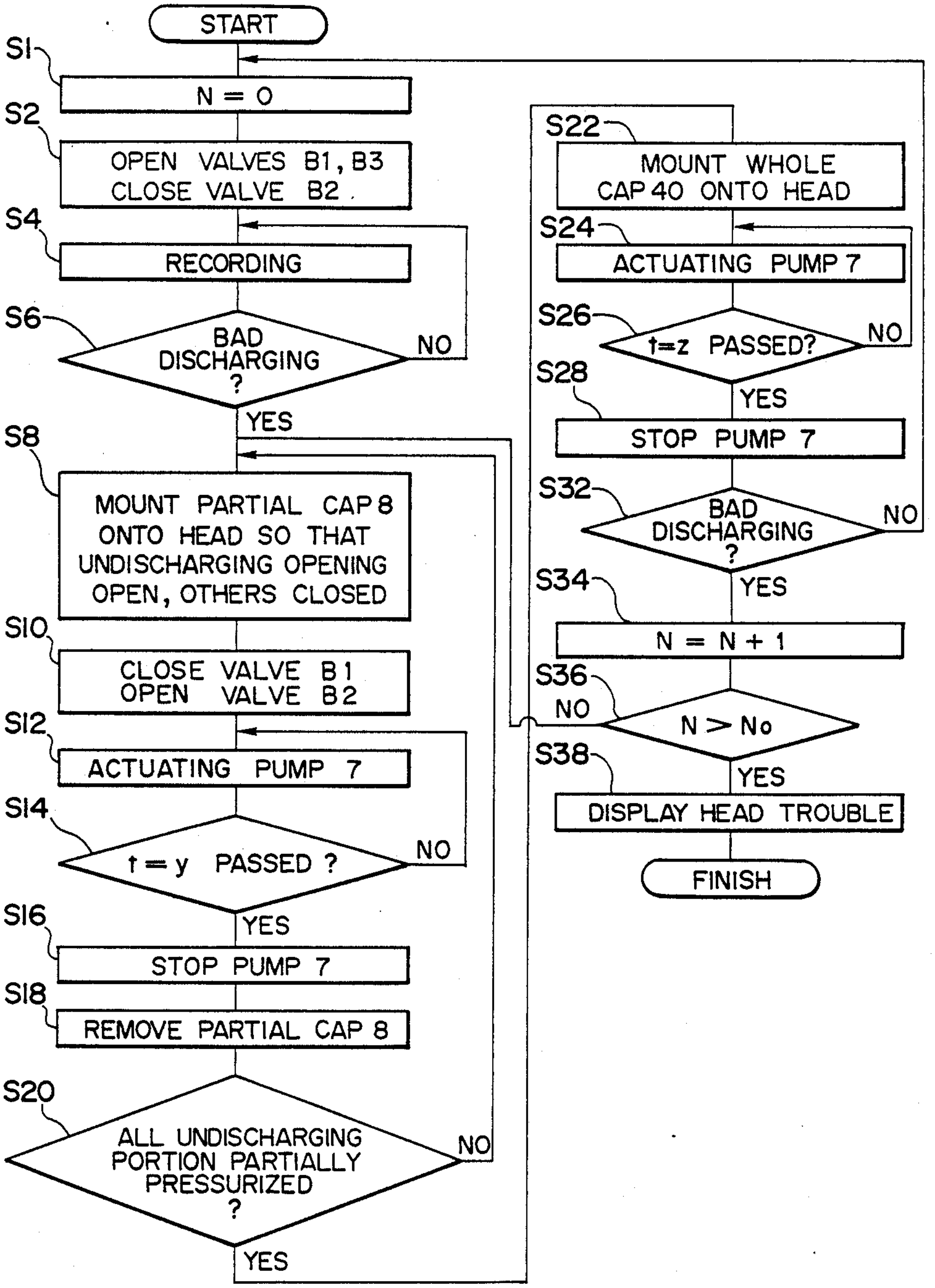
FIG. 22 is a flow chart showing another example of sequence for recording and discharge failure recovery in the control system shown in FIG. 16.

FIG. 22 is a flow chart showing an example of the control sequence for the recording and the discharge failure recovery in the present embodiment. At the start of the sequence, at first a step S1 resets a counter N for counting the number of recovery operations, and a step S2 opens the valves B1 and B3 and closes the valve BS, thereby supplying the ink by capillary action to the discharging element 1 from the ink tank 6 and through the valve B1.

A step S4 executes the recording operation in this state for a predetermined amount or time, and a step S6 detects the discharge failure.

In said detection, the cap 42 of the entire cap 40 is fitted on the discharging element 1 of the recording head H by means of the position setting units 91, 92 as shown in FIG. 21, and the light-emitting element 44 is activated to emit light toward the light-receiving element 46. Then driving pulses are supplied with a predetermined frequency to the energy generating means in the liquid paths 12, in succession starting from the one positioned at the end. Each discharging opening communicating with the normal liquid path emits ink droplet, thus intercepting the light path L and causing a switching operation in the light receiving element 46. On the other hand, each opening communicating with the liquid path involving discharge failure either cannot achieve normal discharge or does not discharge droplet at all, so that the light-receiving element 46 shows unstable switching or is not switched. In this manner the discharge failure is detected, and the position of the liquid path of the energy generating device then activated is stored in the RAM 90C for use in the succeeding recovery operation for the discharge failure. Said detecting operation can be completed in about 1.6 seconds if the discharges are conducted with a driving frequency of 2 KHz for the discharging openings arranged over the width of an A4-sized recording sheet.

The sequence returns to the step S4 if the discharge failure is not detected. On the other hand, if the discharge failure is detected, a step S8 suitably drives the position setting units 91, 92 and the driving unit 93 to place the part 82 in a position close to the discharging opening 10 showing discharge failure, and to fit the partial cap 8 so as to maintain said discharging opening in the open state and others in the closed state. Then a step S10 closes the valve B1 and opens the valve B2, and a step S12 actuates the pump 7.

Thus pressurized ink is introduced in the path leading from the pump 7 to the discharging element 1 through the valve B2, whereby the ink is discharged only from the discharging openings in the open state, thus removing the cause of the discharge failure. For example, in FIG. 20, the ink is discharged from the discharging openings 10 in the open state, whereby the bubble a present in the liquid path 12 is removed.

After the continuation of this state for a predetermined period, identified for example by the arrival of the timer value t at a predetermined value y (step S14), a step S16 deactuates the pump 7, and a step S18 moves the partial cap 8 in the direction F shown in FIG. 20 thereby detaching it from the discharging element 1.

A step S20 discriminates whether the pressurized recovery process has been completed on all the discharging openings 10 showing discharge failure, and, if completed, the sequence proceeds to a step S22. On the other hand, if not completed, the sequence returns to the step S8 for setting the cap 82 to another discharging opening 10 showing discharge failure and effecting the recovery operation for said discharging opening.

If the discrimination is the step S2O turns out affirmative, the step S22 suitably activates the position setting units 91, 92 and the driving unit 93 to fit the entire cap 10, instead of the partial cap 8, on the discharging element 1 Then a step S24 actuates the pump 7 in this state, thereby causing discharge of the ink from all the discharging openings 10. A step S26 continues this operation for a predetermined period (for example unlil the timer value t reaches a predetermined value z), and a step S28 deactuates the pump 7. These steps S22 to S28 may be dispensed with in the present embodiment.

Then a step S32 executes detection of discharge failure as in the step S6. If the result is negative, the sequence returns to the step S1 for preparing for a next recording operation. On the other hand, if the result is affirmative, a step S34 advances the count of the counter N by one, and a step S36 discriminates whether the count of the counter N has exceeded a predetermined value $N_0$, for example "1".

If said discrimination turns out negative, the sequence returns to the step S8 for repeating the recovery operation for the discharge failure. On the other hand, if the step S36 provides an affirmative discrimination, indicating that the cause of discharge failure has not been removed even after a predetermined number of recovery operations, an abnormality is identified, and a step S38 activates the alarm unit 95 to inform the operator of this fact, for example by a display.

As explained in the foregoing, the present embodiment removes the cause of discharge failure by discharging the ink only from a portion in which the discharge failure has occurred, so that it is rendered possible to select a smaller pump 7, or to increase the flow rate per liquid path, and to prevent the wasting of the ink. Besides the present embodiment allows prompt detection of an abnormality in the recording head.

The present invention is effectively and easily applicable to any recording head with plural discharging openings, regardless of whether the number or range of array thereof corresponds to the entire width of the recording medium or not, also regardless of whether it is a line printer with a full-line multiple head or a serial printer, and regardless of the structure of :he ink supply system.

Also in the present invention, the energy generating means for generating energy for ink discharging can be composed of the aforementioned electro-thermal converting element, or a heat generating element having a heat-generating resistor and electrodes connected thereto, or a piezoelectric element serving as an electro-mechanical converter.

Also in the ink jet head to be employed in the present invention, the direction of ink supply to the heat generating portion of the heat generating element in the liquid path and the direction of ink discharging from the discharging opening may be substantially same or different. For example said directions may be substantially perpendicular to each other.

Furthermore the structure and the driving mode of the partial cap and the entire cap are naturally not limited to those in the foregoing embodiments. For example, in the present invention, the entire cap may be dispensed with.

Furthermore, in the recovery of the discharge failure, the aforementioned recovery by partial suction and that by partial pressurizing may be applied simultaneously, alternately or in succession.

Furthermore, the detection of the discharge failure or of the position thereof is not limited to the foregoing embodiments, but may be made visually by the operator in the course of normal recording or test recording, and, in such case, there may be provided switches for actuating the recovery operation and for entering the position of such discharge failure. Also the discharge failure may be detected with an image reading sensor on the result of test recording on the recording medium.

In the foregoing embodiments, the detection and recovery of discharge failure are conducted after the recording operation, but it is also possible to conduct the recovery for the discharge failure immediately after the power supply is activated or after a long pause in the recording operation.

As detailedly explained in the foregoing, the present invention effects the recovery operation by suction or pressure in a part of the plural discharging openings, thereby significantly improving the reliability of the recovery operation. Also the amount of ink consumed in the recovery operation can be minimized, so that the running cost of the apparatus can be significantly lowered. Furthermore since the suction or pressurizing force of the pump can be reduced, so that the cost of this part can be lowered, and, particularly in case of pressurized recovery, it is possible to increase the freedom in the designing of strength in the supply system.

What is claimed is:

1. An ink jet recording apparatus comprising:

an ink jet head having plural openings for discharging ink;

partial capping means for covering a part of said plural discharging openings; and suction means for sucking the ink from said part of discharging openings through said partial capping means.

2. An ink jet recording apparatus according to claim 1, wherein said ink jet head comprises liquid paths communicating with said discharging openings.

3. An ink jet recording apparatus according to claim 2, wherein said liquid paths are provided with energy generating means for generating energy utilized for the ink discharging, and the direction of ink discharge from said discharging openings is substantially same as the direction of ink supply to the position of said energy generating means in said liquid paths.

4. An ink jet recording apparatus according to claim 2, wherein said liquid paths are provided with energy generating means for generating energy utilized for the ink discharging, and the direction of ink discharge from said discharging openings is different from the direction of ink supply to the position of said energy generating means in said liquid paths.

5. An ink jet recording apparatus according to claim 4, wherein said two directions are substantially perpendicular to each other.

6. An ink jet recording apparatus according to claim 2, wherein said ink jet head comprises a common liquid chamber communicating with said liquid paths.

7. An ink jet recording apparatus according to claim 6, wherein said ink jet head comprises a supply pipe communicating with said common liquid chamber.

8. An ink jet recording apparatus according to claim 7, wherein said supply pipe is provided with a filter.

9. An ink jet recording apparatus according to claim 2, wherein said liquid paths are provided with energy generating means for generating energy utilized for the ink discharging.

10. An ink jet recording apparatus according to claim 9, wherein said energy generating means is adapted to generate thermal energy.

11. An ink jet recording apparatus according to claim 9, wherein said energy generating means is an electro-thermal converting element.

12. An ink jet recording apparatus according to claim 11, wherein said electro-thermal converting element comprises a heat generating resistor and electrodes connected thereto.

13. An ink jet recording apparatus according to claim 12, wherein said electro-mechanical converting element is a piezo-electric element.

14. An ink jet recording apparatus according to claim 9, wherein said energy generating means is an electro-mechanical converting element.

15. An ink jet recording apparatus according to claim 1, wherein said plural discharging openings are provided corresponding to the width of a recording medium.

16. An ink jet recording apparatus according to claim 1, wherein said partial capping means is belt-shaped.

17. An ink jet recording apparatus according to claim 1, wherein said partial capping means is adapted, in said state of covering a part of the discharging opening, to close the rest of said openings.

18. An ink jet recording apparatus according to claim 1, wherein said partial capping means is adapted, in said state of covering a part of the discharging openings, to uncover the rest of said openings.

19. An ink jet recording apparatus according to claim 1, further comprising detection means for detecting the ink discharging state from said discharging openings.

20. An ink jet recording apparatus according to claim 19, wherein said detection means is a photocoupler.

21. An ink jet recording apparatus according to claim 1, further comprising detection means for detecting the ink discharging state from said discharging openings, and control means for covering the discharging opening, for which the discharge failure is detected by said detection means, with said partial capping means and effecting suction by said suction means.

22. An ink jet recording apparatus according to claim 1, further comprising an entire cap for covering all of said plural discharging openings.

23. An ink jet recording apparatus according to claim 1, further comprising an entire cap for covering all of said plural discharging openings, and detection means for detecting the ink discharging state from said discharging openings.

24. An ink jet recording apparatus according to claim 1, wherein said suction means is a pump.

25. An ink jet recording apparatus according to claim 1, further comprising a used ink tube communicating with said suction means.

26. An ink jet recording apparatus according to claim 1, further comprising a used ink reservoir communicating with said suction means.

27. A capping unit comprising:

partial capping means for covering a part of plural discharging openings of an ink jet head; and suction means for sucking ink from said part of the discharging openings through said partial capping means.

28. A capping unit according to claim 27, wherein said partial capping means is composed of a belt.

29. A capping unit according to claim 27, wherein said partial capping means is adapted, in a state covering said part of the discharging openings, to close the rest of the discharging openings.

30. A capping unit according to claim 27, wherein said partial capping means is adapted, in a state covering said part of the discharging openings, to open the rest of the discharging openings.

31. A capping unit according to claim 27, further comprising detection means for detecting the ink discharging state from the discharging openings.

32. A capping unit according to claim 31, wherein said detection means is a photocoupler.

33. A capping unit according to claim 27, further comprising an entire cap for covering all of the plural discharging openings.

34. A capping unit according to claim 27, further comprising an entire cap for covering all of the plural discharging openings, and detection means for detecting the ink discharging state from the discharging openings.

35. A capping unit according to claim 27, wherein said suction means is a pump.

36. An ink jet recording apparatus comprising:

an ink jet head having plural openings for discharging ink;

closing means for closing a part of said plural discharging openings; and pressurizing means for pressurizing the ink in said ink jet head, thereby ejecting ink from the discharging openings other than those of said part.

37. An ink jet recording apparatus according to claim 36, wherein said ink jet head comprises liquid paths communicating with said discharging openings.

38. An ink jet recording apparatus according to claim 37, wherein said liquid paths are provided with energy generating means for generating energy utilized for ink discharging, and the direction of ink discharging from said discharging opening is substantially same as the direction of ink supply to the position of said energy generating means in said liquid path.

39. An ink jet recording apparatus according to claim 37, wherein said liquid paths are provided with energy generating means for generating energy utilized for ink discharging, and the direction of ink discharging from said discharging opening is different from the direction of ink supply to the position of said energy generating means in said liquid path.

40. An ink jet recording apparatus according to claim 39, wherein said two directions are substantially perpendicular to each other.

41. An ink jet recording apparatus according to claim 37, wherein said ink jet head comprises a common liquid chamber communicating with said liquid paths.

42. An ink jet recording apparatus according to claim 41, wherein said ink jet head comprises a supply pipe communicating with said common liquid chamber.

43. An ink jet recording apparatus according to claim 42, wherein said supply pipe is provided with a filter.

44. An ink jet recording apparatus according to claim 37, wherein said liquid paths are provided with energy generating means for generating energy utilized for ink discharging.

45. An ink jet recording apparatus according to claim 44, wherein said energy generating means is an electrothermal converter element.

46. An ink jet recording apparatus according to claim 45, wherein said electro-thermal converter element comprises a heat generating resistor and electrodes connected thereto.

47. An ink jet recording apparatus according to claim 44, wherein said energy generating means is an electromechanical converter element.

48. An ink jet recording apparatus according to claim 47, wherein said electro-mechanical converter element is a piezo-electric element.

49. An ink jet recording apparatus according to claim 44, wherein said energy generating means is adapted to generate thermal energy.

50. An ink jet recording apparatus according to claim 36, wherein said plural discharging openings are provided corresponding to the width of recording medium.

51. An ink jet recording apparatus according to claim 36, wherein said closing means is belt-shaped.

52. An ink jet recording apparatus according to claim 36, further comprising detection means for detecting the ink discharge stat from said discharging openings.

53. An ink jet recording apparatus according to claim 52, wherein said detection means is a photocoupler.

54. An ink jet recording apparatus according to claim 36, further comprising detection means for detecting the ink discharge state from said discharging openings, and control means for covering other discharging openings than the discharging opening for which the discharge failure is detected by said detection means and effecting pressurizing by said pressurizing means.

55. An ink jet recording apparatus according to claim 36, further comprising an entire cap for covering all of said plural discharging openings.

56. An ink jet recording apparatus according to claim 36, further comprising an entire cap for covering all of said plural discharging openings, and detection means provided in said entire cap for detecting the ink discharge state from said discharging openings.

57. An ink jet recording apparatus according to claim 36, wherein said pressurizing means is a pump.

58. An ink jet recording apparatus according to claim 36, further comprising a used ink tube communicating with said closing means.

59. An ink jet recording apparatus according to claim 36, further comprising a used ink reservoir communicating with said closing means.

60. A recovery method for an ink jet head comprising:

a detection step for detecting the ink discharging state from plural discharging openings of said ink jet head;

a partial capping step for covering a part of said plural discharging openings, including the discharging opening for which the discharge failure is detected, with partial capping means; and a partial suction step for sucking ink from said part of the discharging openings through said partial capping means.

61. A recovery method according to claim 60, further comprising an entire suction step for sucking the ink from all of said plural discharging openings, after said partial suction step.

62. A recovery method according to claim 60, wherein said partial suction step is conducted simultaneously with a partial pressurizing step in which the interior of said ink jet head is pressurized to emit the ink from said part of the discharging openings.

63. A recovery method according to claim 60, wherein said partial suction step is alternately conducted with a partial pressurizing step in which the interior of said ink jet head is pressurized to discharge the ink from said part of the discharging openings.

64. A recovery method for an ink jet bead comprising:

a detection step for detecting the ink discharge state from plural discharging openings of said ink jet head;

a partial closing step for closing a part of said plural discharging openings, excluding the discharging opening for which the discharge failure is detected, with closing means; and a partial pressurizing step for pressurizing the interior of said ink jet head thereby discharging ink from the discharging openings not closed by said closing means.

65. A recovery method according to claim 64, further comprising an entire pressurizing step, after said partial pressurizing step, for removing the closing by said closing means and pressurizing the interior of said ink jet head thereby discharging ink from all of the plural discharging openings.

* * * * *

UNITED STATES PATENT AND TRADEMARK OFFICE
CERTIFICATE OF CORRECTION

PATENT NO. : 4,947,191

DATED : August 7, 1990

INVENTOR(S) : MINORU NOZAWA, ET AL.

It is certified that error appears in the above-identified patent and that said Letters Patent is hereby corrected as shown below:

COLUMN 1

Line 35, "16. 17" should read --16, 17--.
Line 43, "view" should read --views--.

COLUMN 5

Line 55, "brought" should read --brought,--.

COLUMN 6

Line 67, "detects" should read --detect--.

COLUMN 7

Line 57, "openIngs" should read --openings--.

COLUMN 8

Line 60, "8S" should read --82--.

COLUMN 9

Line 19, "91. 92" should read --91, 92--.
Line 22, "state." should read --state,--.

COLUMN 10

Line 4, "discharging element, 1" should read --discharging element 1,--.

UNITED STATES PATENT AND TRADEMARK OFFICE
CERTIFICATE OF CORRECTION

PATENT NO. : 4,947,191
DATED : August 7, 1990
INVENTOR(S) : MINORU NOZAWA, ET AL.

It is certified that error appears in the above-identified patent and that said Letters Patent is hereby corrected as shown below:

COLUMN 11

Line 26, "mean" should read --means--.
Line 45, "BS," should read --B2,--.

COLUMN 12

Line 45, "ment 1" should read --ment 1.--.

COLUMN 13

Line 15, ":he" should read --the--.

COLUMN 14

Line 15, "same" should read --the same--.

COLUMN 16

Line 11, "opening" should read --openings--.
Line 13, "path." should read --paths.--.
Line 18, "opening" should read --openings--.
Line 20, "path." should read --paths.--.
Line 54, "of recording" should read --of a recording--.
Line 59, "stat" should read --state--.

UNITED STATES PATENT AND TRADEMARK OFFICE
CERTIFICATE OF CORRECTION

PATENT NO. : 4,947,191

DATED : August 7, 1990

INVENTOR(S) : MINORU NOZAWA, ET AL.

It is certified that error appears in the above-identified patent and that said Letters Patent is hereby corrected as shown below:

COLUMN 18

Line 13, "bead" should read --head--.

Signed and Sealed this

Twenty-fifth Day of August, 1992

Attest:

DOUGLAS B. COMER

*Attesting Officer* *Acting Commissioner of Patents and Trademarks*